United States Patent Office  3,574,095
Patented Apr. 6, 1971

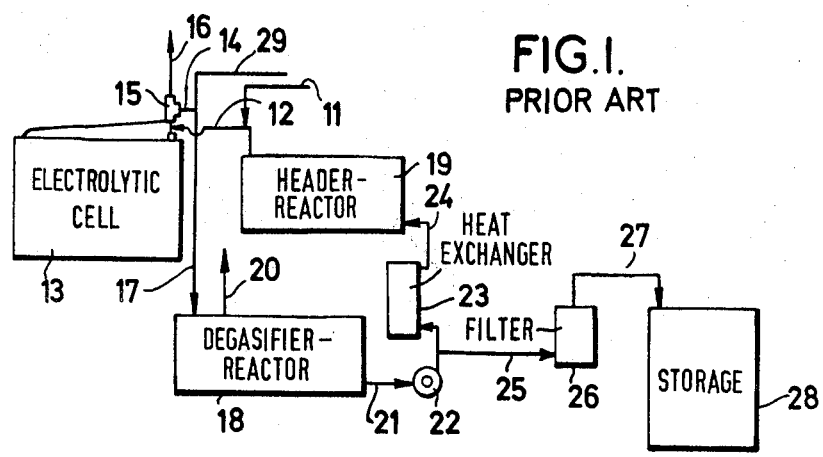
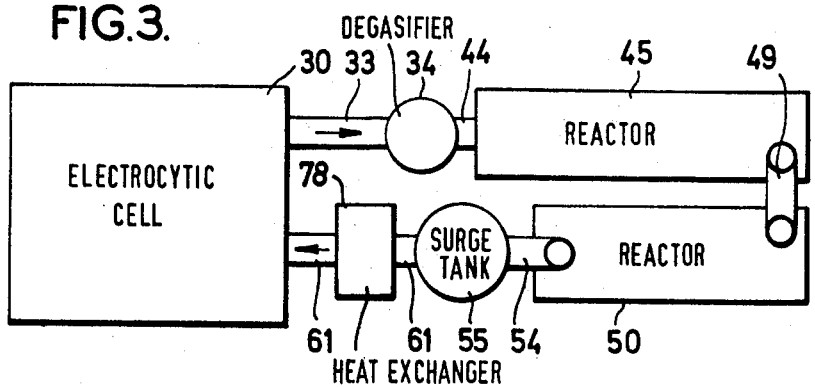
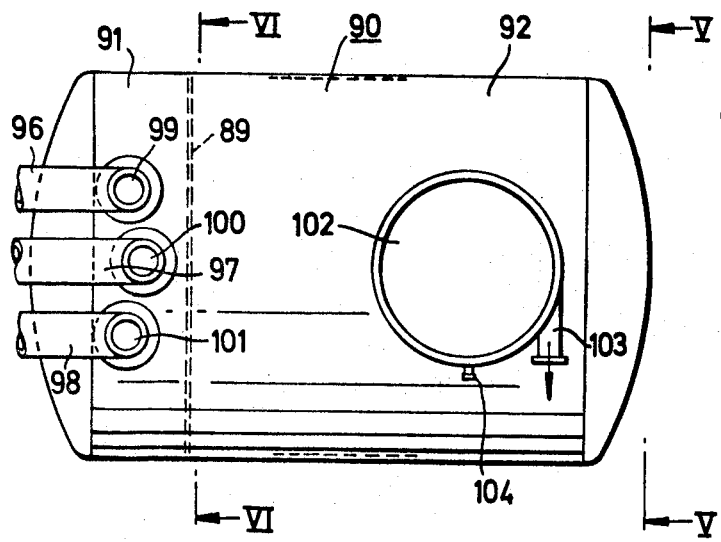

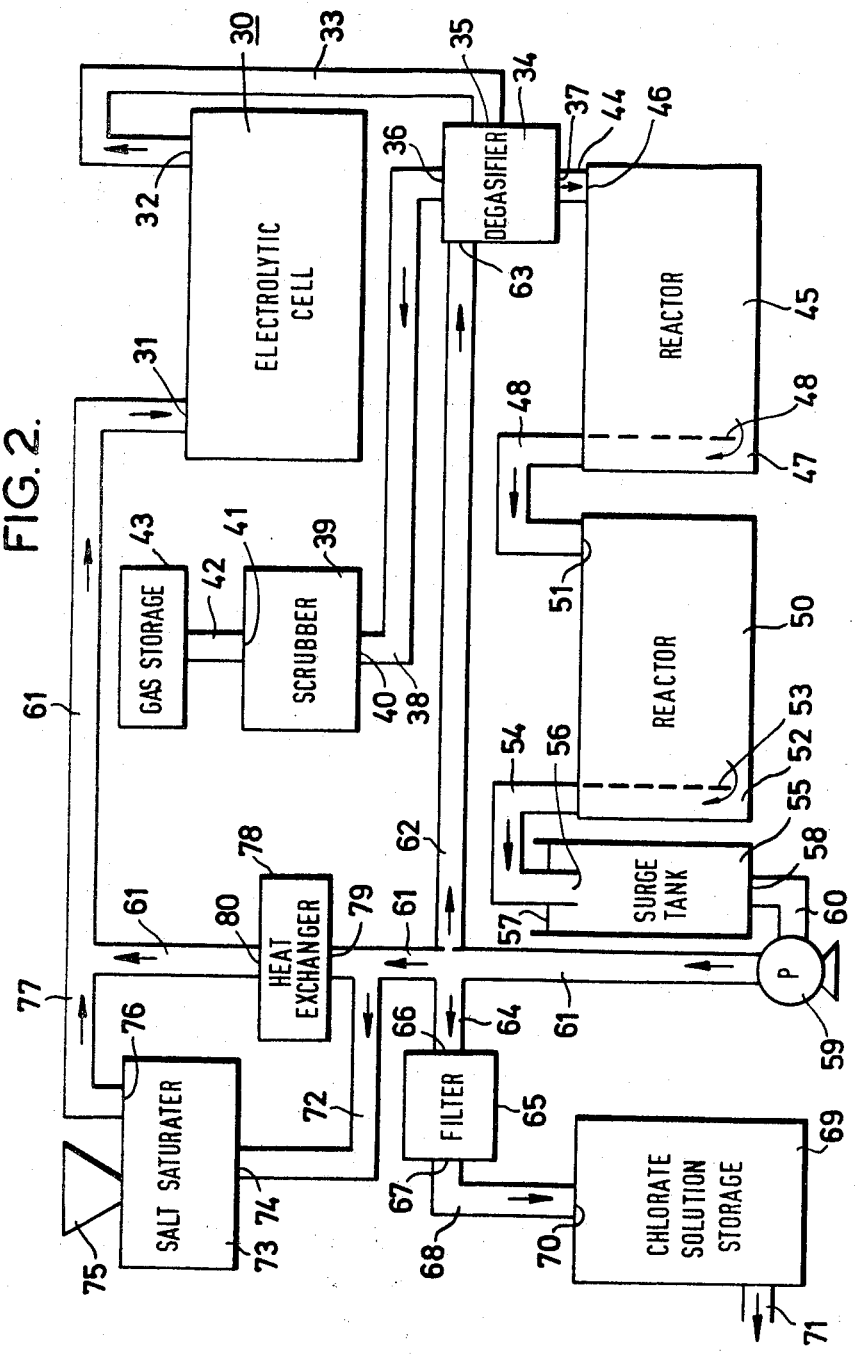

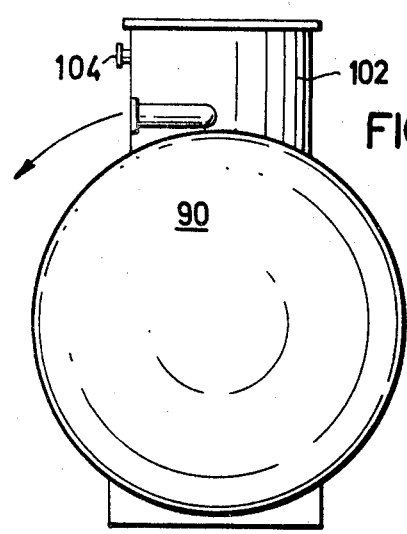
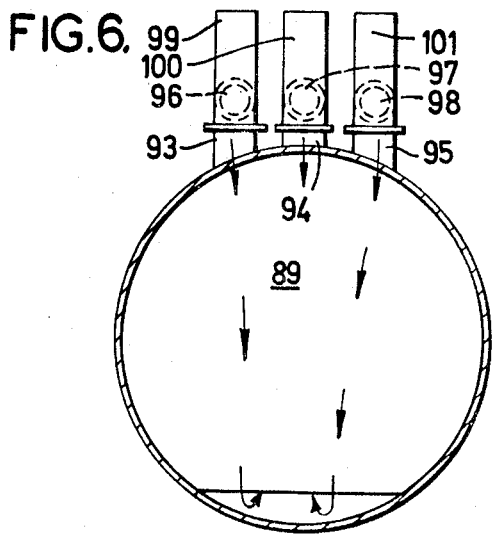
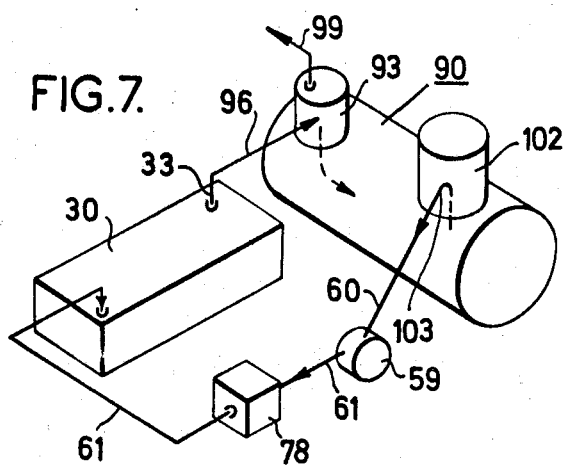
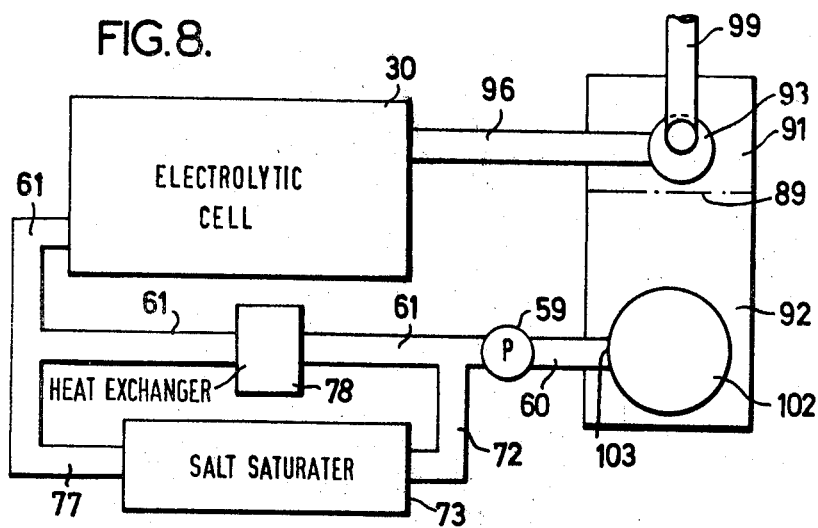

3,574,095
CHLORATE SYSTEM
Göthe O. Westerlund, 5041 Cypress St.,
Vancouver, British Columbia, Canada
Filed Aug. 30, 1968, Ser. No. 759,258
Int. Cl. B01k 1/00; C01b 11/26
U.S. Cl. 204—236                                          38 Claims

ABSTRACT OF THE DISCLOSURE

Novel electrolysis systems of the closed loop variety are provided in which novel degasifier means are provided in the closed loop and which are so constructed and arranged as to remove at least 99% of the entrained and/or entrapped gaseous products of electrolysis from the liquid primary products of electrolysis, in combination with novel reactor means, surge tank means and liquid temperature control varying means.

---

This invention relates to the production of metal chlorates, particularly alkali metal chlorates. The present invention relates specifically to improved electrolysis apparatuses and improved electrolysis processes.

In Canadian Patent No. 741,778 issued Aug. 30, 1966 to Göthe Oscar Westerlund an electrolysis apparatus is disclosed, which apparatus includes the following elements: an enclosed bipolar electrolytic cell provided with inlet and outlet means; means associated with the outlet means providing at least a partial separation of the gaseous products of electrolysis from the effluent electrolyte; vent means for those gases; means conducting the effluent electrolyte to a reacting and degasifying chamber; gaseous vent means on the reacting and degasifying chamber; recycle means for conducting effluent from the reacting and degasifying chamber to a heat exchanger; means conducting the effluent from the heat exchanger to a header tank and reacting chamber; and means conducting effluent from the header tank and reacting chamber together with fresh electrolyte to the enclosed bipolar electrolyte.

The above-described Canadian patent also provided a disclosure of a modification to that apparatus which included firstly, a branch line from the reacting and degasifying chamber to a filter; secondly, conduit means from the filter; and finally, storage means for effluent from the filter.

In addition, the above-identified Canadian patent provided a description of an electrolysis procedure which included the steps of effecting an electrolysis reaction of an aqueous solution of a metal halide; effecting a partial separation of the liquid products of that electrolysis from the gaseous products of the electrolysis; effecting a degasification and a reaction between primary products of the electrolysis; adjusting the temperature of those products of reaction; effecting a further reaction of those products of reaction; and finally recycling some of the reaction products back to the electrolysis reaction. Furthermore, that Canadian patent provided a description of a modification of such procedure which included the additional step of withdrawing and storing some of the reaction products.

The present invention is an improvement in or modification of the disclosures of the above-identified Canadian patent. Thus, an object of a broad aspect of this invention is the provision of an improved and efficient system of components for a forced circulation, closed loop system for effecting an electrolysis reaction.

An object of a second aspect of this invention is the provision of such an improved system in which 99% or more of the entrained and/or entrapped gaseous products of electrolysis are separated from the electrolytic cell effluent liquor.

An object of a third aspect of this invention is to provide such an improved system in which the degasifier means is directly connected to the reactor means.

An object of a fourth aspect of this invention is to provide such an improved system including means for breaking any foam which might be formed in the degasifier.

An object of a fifth aspect of this invention is to provide such an improved system provided with means for maintaining the reactant liquor at a desired concentration.

An object of a sixth aspect of this invention is to provide such an improved system including gas scrubber means and means for utilizing the scrub liquor.

An object of a seventh aspect of this invention is to provide such an improved system including a dump/auxiliary tank connected to the surge tank.

An object of an eighth aspect of this invention is to provide such an improved system including a pair of such electrolytic cells interconnected to provide a unitary master system.

An object of a ninth aspect of this invention is to provide such an improved system including a pair of such interconnected unitary master systems interconnected to provide a comprehensive electrolysis system.

An object of a tenth aspect of this invention is to provide an improved such system in which the number of individual components is reduced by a novel combination of elements.

An object of an eleventh aspect of this invention is to provide such a system in which a unitary reactor tank of novel design and function is utilized.

By one broad aspect of this invention, a forced circulation, closed loop system is provided for effecting an electrolysis reaction and recovering subsequently reacted products of electrolysis comprising: (1) an electrolytic cell provided with liquor inlet means and outlet means for liquor and entrained and/or entrapped gaseous products of electrolysis; (2) degasifier means connected to the outlet means and constructed and arranged to remove at least 99% of the entrained and/or entrapped gaseous products of electrolysis from the liquid primary products of electrolysis, that degasifier means including (i) outlet means for the separated gases, and (ii) effluent means for the substantially gas-free liquor; (3) reactor means including liquor inlet means and liquor outlet means, the liquor inlet means being fed from effluent means (2)(ii), these reactor means being so constructed and arranged as to be substantially full of that substantially gas-free liquor during the course of the reaction of the liquid primary products of electrolysis and to provide sufficient retention time to effect such reaction; (4) surge tank means including liquor inlet means and liquor outlet means, the liquor inlet means being fed from overflow from the liquor outlet means of the reactor means, for accommodating liquor volume changes in the system; (5) conduit means from the liquor outlet from the surge tank to the liquor inlet means; and (6) liquor temperature varying means disposed in the conduit means (5) for controlling the temperature of the liquor fed to the electrolytic cell.

In one embodiment of this aspect of this invention, the degasifier means is disposed outside of, but close to, the electrolytic cell. In a second embodiment of this aspect of this invention, the regasifier means is disposed atop, and directly connected to, the reactor means.

In a third embodiment of this aspect of this invention, the reactor means includes two interconnected reaction vessels, the interconnection permitting the second reactor to be fed from overflow from the first reaction vessel, while maintaining the second reaction vessel substantially liquor full.

In a fourth embodiment of this aspect of this invention, the reactor means comprises (a) a dome for the separation of gas from a liquid; (b) inlet means to the top of the dome; (c) a main horizontally disposed reactor interconnected with the dome; (d) outlet means from the top of the main horizontal reactor; and (e) additional reactant inlet means to the main horizontal reactor.

In a fifth embodiment of this aspect of this invention, the main horizontally disposed reactor is divided into (i) a primary chamber occupying 25% or less of the volume of the reactor tank; and (ii) a secondary chamber occupying 75% or more of the volume of the reactor tank by means of a (iii) dividing wall, in liquid-tight engagement with the sides and top of the enclosed tank and extending downwardly from the top of the tank by an amount of 90% or more of the height of the tank.

In a sixth embodiment of this aspect of this invention, the main horizontally disposed reactor is divided into a pair of interconnected reaction chambers by means of a vertical, longitudinally extending wall, having an opening at one end remote from the inlet means to the reactor, especially when the dividing wall is provided with heat exchanger means adapted to have coolant circulating therein, e.g. the dividing wall comprises a pair of spaced apart walls adapted to have coolant circulating therebetween.

In a seventh embodiment of this aspect of this invention, the reactor means and the surge tank means are provided by a unitary vessel.

In an eighth embodiment of this aspect of this invention, the unitary reactor means and surge tank includes: (I) inlet means, fed from the outlet means from the electrolytic cell container, leading to a degasifier zone portion of said means, the degasifier zone including an upper zone for released gases, leading to a gas outlet line, and a lower zone for a column of substantially gas-free liquor; (II) a reaction zone disposed below, and fed from said column of substantially gas-free liquor, the reaction zone being disposed in a horizontal inclination; and (III) a surge zone, disposed in a vertical inclination, fed from the horizontal reaction zone, the column of liquor in the surge zone being higher than the column of liquor in the degasifier zone, the surge zone having an outlet for liquor connected to the liquor inlet means of the electrolytic cell container, especially when the discharge from the electrolytic cell container to the degasifier zone is tangential to said zone, or where the degasifier zone discharges directly into the surge zone, which therefore becomes a combined reaction zone and surge zone.

In a ninth embodiment of this aspect of this invention, there is included a first branch line from conduit means (5) to the degasifier means (2) for defoaming by means of a liquor spray. In a tenth embodiment of this aspect of this invention, there is included a second branch line from conduit means (5) for withdrawing a desired proportion of reactant liquor, the second branch line including a filter disposed therein, and a liquor storage means. In an eleventh embodiment of this aspect of this invention, there is included a third branch line from conduit means (5) for passing a desired proportion of liquor through a salt saturator thereby to bring the reactant liquor up to required strength. In a twelfth embodiment of this aspect of this invention, there is included a gas transporting line from the outlet means (2)(i), leading to a gas scrubber and gas storage means.

In a thirteenth embodiment of this aspect of this invention, the gas scrubber includes (a) gas inlet means adjacent the lower portion thereof; (b) scrubbed gas outlet means adjacent the upper portion thereof; (c) scrub liquor inlet means adjacent the upper portion thereof; (d) scrub liquor recycle lines from adjacent the lower portion thereof to the adjacent upper portion thereof; and (e) liquor outlet means leading from said gas scrubber to said electrolytic cell, especially when the liquor outlet means (e) includes vent means.

By another aspect of this invention, a forced circulation, closed loop system is provided for the electrolysis of a metal chloride and the production and recovery of a metal chlorate, which system comprises: (I) an electrolytic cell for the electrolysis of an aqueous solution of a metal chloride, e.g. sodium chloride; (II) a primary reactor, the primary reactor including: (a) a dome for the separation of gas from a liquid, (b) inlet means to the top of the dome, (c) a main horizontally disposed reactor interconnected with the dome, (d) outlet means from the top of the main horizontal reactor, and (e) additional reactant inlet means to the main horizontal reactor; (III) a fluid conduction line from the electrolytic cell to the dome for conducting liquor containing gaseous products dissolved and/or occluded therein from the electrolytic cell to the dome of the primary reactor; (IV) a secondary reactor, such secondary reactor including: (a) liquor inlet means at the top thereof, and (b) outlet means from the top thereof; (V) a liquor conduction line from the outlet (d) of the primary reactor (II) to the inlet means (a) of the secondary reactor (IV) for conducting liquor which overflows from the primary reactor (II) to the secondary reactor (IV); (VI) a surge tank, the surge tank including: (a) liquor inlet means thereinto, and (b) liquor outlet means from the bottom thereof; and (VII) a liquor-conducting line from the surge tank branching into two lines: (a) a main line for recycling liquor back to the electrolytic cell, and (b) a subsidiary line for conducting a desired proportion of the liquor to a product storage and/or recovery tank.

In a first embodiment of this other aspect of this invention, a gas scrubber is included to receive gas which is partly but primarily separated at the gas separation dome and partly by secondarily by the primary reactor, such gas being treated, in the gas scrubber with sodium hydroxide solution, the hydrogen gas either being vented to atmosphere or being recovered for use, concentrated scrub liquor therefrom being then conveyed to the reactor. In a second embodiment of this other aspect of this invention, a salt saturator is included for preparing sodium chloride brine for conduction to the surge tank, and including a recycle line from the surge tank for conducting liquor from the surge tank back to the salt saturator. In a third embodiment of this other aspect of this invention, a filtration system is included disposed in the subsidiary line for filtering liquor from a surge tank prior to conducting it to the product storage and/or recovery tank. In a fourth embodiment of this other aspect of this invention, a sump is included to receive liquor from all the process drains, leaks or spills, and a dump/auxiliary tank is provided to receive the overflow from the surge tank for conducting such liquor, as well as liquor from the sump, when required, to the brine inlet line to the surge tank.

In a fifth embodiment of this other aspect of this invention, a pair of such electrolytic cells is used, and a pair of gas separation domes is provided on the primary reactor, each dome being fed by liquor from one of the electrolytic cells. In a sixth embodiment of this other aspect of this invention, a pair of interconnected such systems as in the fifth embodiment are used, and there is provided firstly, a common salt saturator to provide fresh feed for each of the four electrolytic cells; secondly, a common filtration system for filtering the liquor conducted in the subsidiary lines of each of the two interconnected systems, the filtration system leading to common product storage and/or recovery tanks; and thirdly, a common dump/auxiliary tank to receive the overflow from each of the surge tanks.

In a seventh embodiment of this other aspect of this invention, the salt saturator is in the first of said pair of interconnected systems, and the salt solution so formed cascades into the second of said pair of interconnected systems, thereby providing higher chloride than in the preceding system.

By a further aspect of this invention, a forced circulation, closed loop system is provided for effecting an electrolysis reaction and subsequently recovering reacted products of the primary reaction products of electrolysis, the system comprising: (1) electrolytic cell container provided with liquor inlet means and outlet means for liquor and primary products of electrolysis and for entrained and/or entrapped gaseous products of electrolysis; and (2) an integrated degasifier-reactor-surge tank means connected to the electrolytic cell container, the degasifier-reactor-surge tank means including (I) inlet means, fed from the outlet means from the electrolytic cell container, leading to a degasifier zone portion of said means, the degasifier zone including an upper zone for released gases, leading to a gas outlet line, and a lower zone for a column of substantially gas-free liquor, (II) a reaction zone disposed below, and fed from said column of substantially gas-free liquor, the reaction zone being disposed in a horizontal inclination, and (III) a surge zone, disposed in a vertical inclination, fed from the horizontal reaction zone, the column of liquor in the surge zone being higher than the column of liquor in the degasifier zone, the surge zone having an outlet for liquor connected to the liquor inlet means of the electrolytic cell container.

In a first embodiment of this further aspect of this invention, the discharge from the electrolytic cell container to the degasifier zone is tangential to said zone. In a second embodiment of this further aspect of this invention, there is included baffle means between the reaction zone and the surge zone. In a third embodiment of this further aspect of this invention, the surge zone is provided with inlet means, e.g. for water and muriatic acid, for dichromate, and for salt and/or brine. In a fourth embodiment of this further aspect of this invention, the degasifier zone discharges directly into the surge zone, which therefore becomes a combined reaction zone and surge zone.

In a fifth embodiment of this further aspect of this invention, means are provided in the closed loop system for causing forced circulation. In one variant of the sixth embodiment of this further aspect of this invention, the means is a circulating pump or an impeller. In a second variant of this sixth embodiment of this further aspect of this invention, the means is a gas lift resulting from the pipe-riser of the effluent from the electrolytic cell container, and wherein the liquor level in the degasifier zone is higher than the liquor level in the surge zone.

In a seventh embodiment of this further aspect of this invention, means are provided in the closed loop system for heat removal. In one variant of this seventh embodiment of this further aspect of this invention, the means are immersed cooling coils, or plate heat exchangers or tube heat exchangers disposed in the reaction zone or in the surge zone or in the reactor. In a second variant of this seventh embodiment of this further aspect of this invention, the means are cooling coils or plate heat exchangers or tube heat exchangers disposed between the surge zone and the electrolytic cell container.

In an eighth embodiment of this further aspect of this invention, the electrolytic cell container is located at the same elevation as the reaction zone.

By an additional aspect of this invention, such a system is provided in which the unitary reactor tank which is provided comprises: (A) a horizontally disposed enclosed tank divided into: (i) a primary chamber occupying, for example, 25% or less of the volume of the reactor tank, and (ii) a secondary chamber occupying, for example, 75% or more of the volume of the reactor tank, by means of a: (III) dividing wall, in liquid-tight engagement with the sides and top of the enclosed tank and extending downwardly from the top of the tank by an amount of 90% or more of the height of the tank; (B) an upstanding gas-separating dome superposed over the primary chamber and leading directly thereto to provide a liquid flow path from the dome to the primary chamber, the dome being provided with: (i) a liquor-conducting inlet conduit adjacent the mid-portion or higher of the gas-separating dome to conduct liquor containing entrained, entrapped, and/or occluded gas to the gas-separating dome, and (ii) a gas-conducting outlet line connected to the top of the gas-separating dome to conduct gas separated from the liquor away from the gas-separating zone; and (C) an upstanding surge and head tank superposed over the region of the secondary reactor remote from the dividing wall, such tank providing a direct liquor flow path from the secondary chamber, the surge and head tank including: (i) a liquor outlet conduit disposed above the level of the secondary chamber but near the bottom of the surge and head tank, thereby to provide means for the discharge of liquor overflowing from the secondary chamber, and (ii) a level control liquor outlet near the top of the surge and head tank, thereby to provide means for discharging overflow from the surge and head tank.

In a first embodiment of this additional aspect of this invention, a foam break-down, spray nozzle is included in the gas-separating dome (B).

In a second embodiment of this additional aspect of this invention, an electrolytic cell is provided having a liquor outlet connected to the gas-separating dome inlet, the liquor outlet from the surge and head tank being connected to a pump and heat exchanger which leads liquor back to the cell and a predetermined proportion of the liquor away to a product storage and/or recovery tank. In a third embodiment of this additional aspect of this invention, a salt saturator is provided which is disposed in parallel with the line from the surge and head tank to the electrolytic cell.

In a fourth embodiment of this aspect of this invention, a gas lift means is included to provide forced circulation liquor flow.

It is to be noted that while the various embodiments and variants of the many aspects of this invention are provided hereinabove as individual elements in the overall system, these embodiments and variants may be used in combination in any of the many aspects of this invention in any of a number of permutations and combinations.

The present invention, thus, is concerned with the well-known procedure for the production of metal chlorates, particularly alkali metal chlorates. It is well known that alkali metal chlorates may be prepared by electrolysis of an aqueous solution of an alkali metal chloride. In this process elemental chlorine is evolved at the anode, hydrogen at the cathode, and wih hydroxyl ion concentration increase in the electrolyte. Since there is no diaphragm at the anode, the primary product of the electrolysis at the anode reacts with electrolyte to form intermediate products and ultimately the final product, namely, the alkali metal chlorate.

The simplified reaction in the aforesaid electrolysis may be summarized as:

$$MtCl + 3H_2O + 6 \text{ Faradays} \rightarrow MtClO_3 + 3H_2$$

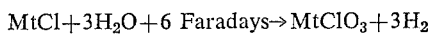

The main reactions in the electrolytic preparation of the metal chlorate from the metal chloride may be represented as follows:

Primary reactions

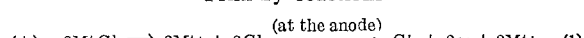

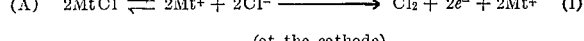

Secondary reactions (C) $\quad Cl_2 + OH^- \rightarrow ClOH + Cl^-$ \qquad (3)

$ClOH \rightleftharpoons H^+ + OCl^-$ \qquad (4)

(D) $\quad 2ClOH + ClO^- \rightarrow ClO_3^- + 2Cl^- + 2H^+$ \qquad (5)

Undesirable side reactions (E) Oxidation at the anode $$HClO + H_2O \rightarrow O_2 + 3H^+ + Cl^- + 2e^- \qquad (6)$$

$$2H_2O \rightarrow O_2 + 4H^+ + 4e^- \qquad (7)$$

(F) Reduction at the cathode $$ClO^- + H_2O + 2e^- \rightarrow Cl^- + 2OH^- \qquad (8)$$

$$ClO_3^- + 3H_2O + 6e^- \rightarrow Cl^- + 6OH^- \qquad (9)$$

(G) Hypochloride attack by nascent hydrogen $$ClO^- + 2H \rightarrow H_2O + Cl^- \qquad (10)$$

(H) Breakdown reactions in sunlight $$2HClO \rightarrow 2HCl + O_2 \qquad (11)$$

$$HClO + HCl \rightarrow H_2O + Cl_2 \qquad (12)$$

(I) Breakdown reaction in the presence of catalysts $$2MtClO \rightarrow 2MtCl + O_2 \qquad (13)$$

(J) Breakdown due to vapor pressure $$Cl_2 \text{ (in solution)} \rightarrow Cl_2 \text{ (gaseous)} \qquad (14)$$

In the accompanying drawings,

FIG. 1 is a schematic flow sheet of a system for chlorate manufacture as taught by Canadian Patent No. 741,778 issued Aug. 30, 1966, to Göthe O. Westerlund, and is representative of the prior art systems;

FIG. 2 is a schematic flow sheet of a system for chlorate manufacture according to a broad aspect of this invention;

FIG. 3 is a schematic top plan flow diagram of a system for chlorate manufacture according to another aspect of this invention;

FIG. 4 is a top plan view of a unitary reactor according to an additional aspect of this invention;

FIG. 5 is a side elevational view along the line V—V of FIG. 4;

FIG. 6 is a cross-sectional view along the line VI—VI of FIG. 4;

FIG. 7 is an idealized perspective view of a system for chlorate manufacture using the unitary reactor of FIGS. 4, 5 and 6, according to yet another aspect of this invention;

FIG. 8 is a schematic top plan flow diagram of a system for chlorate manufacture according to a further aspect of this invention;

Figure 9:
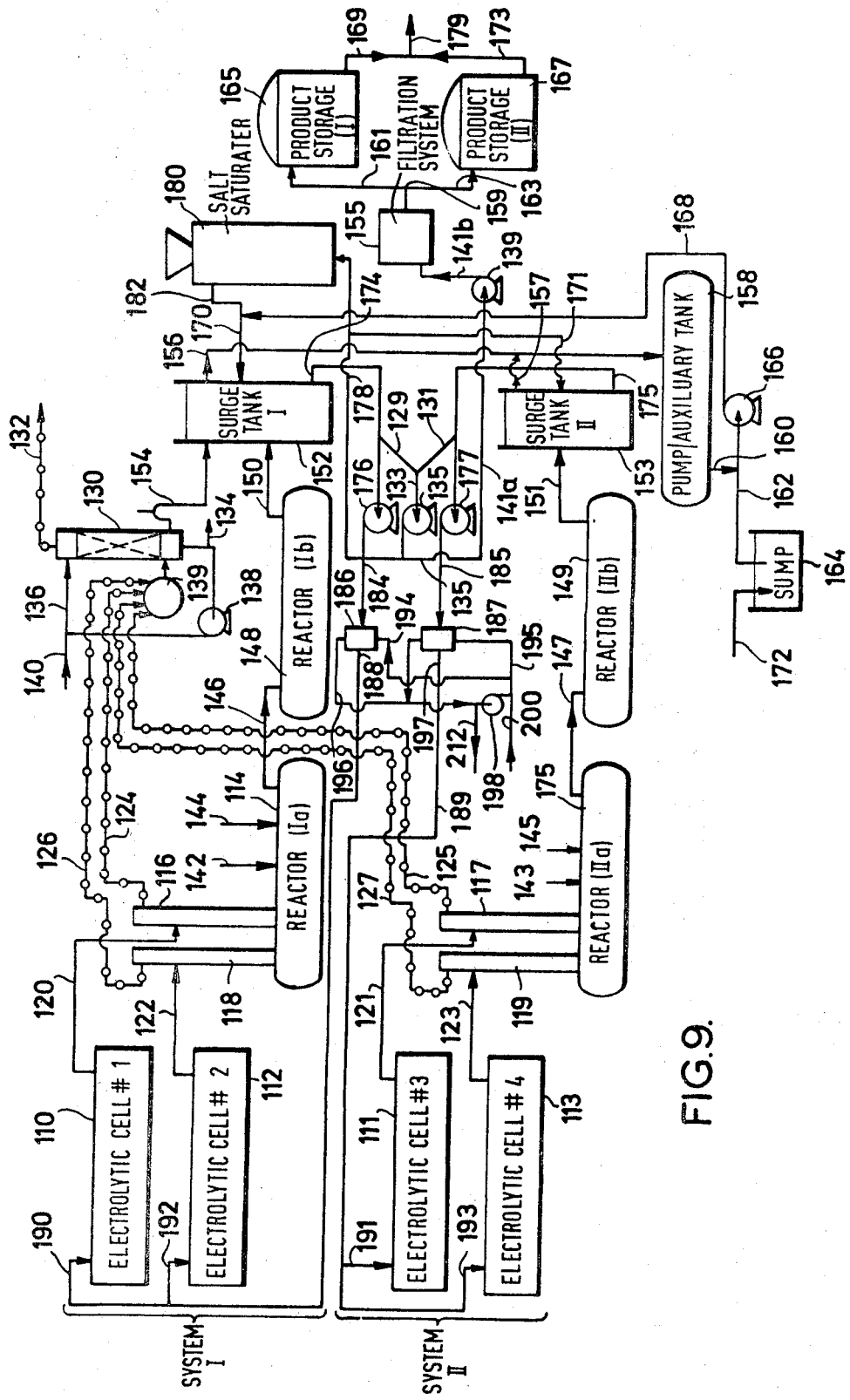
FIG. 9 is a schematic flow diagram of a system for chlorate manufacture according to other aspects of this invention.

Referring to FIG. 1, electrolyte, consisting of fresh electrolyte from line 11 and recycled electrolyte from line 12, enters the electrolytic cell 13 through inlet header 14. Electrolysis proceeds, and effluent, consisting of $Cl_2$, $Na^+$, $H_2$, $OH^-$, $ClOH$, $Cl^-$, $H^+$, and $OCl^-$ leaves via outlet header to T-separator 15. Entrained gases, permitted to separate in T-separator 15, and which consist of $H_2$, $H_2O$ (vapor), $O_2$, $CO_2$ and $Cl_2$ leave via vent line 16. The effluent liquor passes from T-separator 15 via line 17 to degasifier-reactor 18.

The cross-sectional area of the degasifier-reactor 18 is specifically designed and is of such a size that the liquor velocity is reduced to such an extent that optimum separation of the entrained gases takes place without short circuiting through the tank, which would result from too low a liquor velocity. The velocity, on the other hand, must be sufficient to utilize the entire vessel but not too rapid to inhibit the expulsion of the entrained gases. The optimum velocity is a function of the apparent density of the liquid, which, in turn, is dependent on the amount of entrained gases and the bubble size. It has been found that a liquor velocity of about 2 ft./sec. can separate more than 95% of the entrapped gases.

The degasifier-reactor 18 also is for the purpose of permitting the reaction $$2ClOH + ClO^- \rightarrow ClO_3^- + 2Cl^- + 2H^+ \qquad (5)$$

to take place. For any selected temperature, the retention time in the degasifier-reactor 18 is a function of the concentration of ClOH and ClO⁻ present in the liquor which in turn is directly related to the current concentration. Thus, it was found that to yield a current efficiency of greater than 90%, with a constant recirculation of liquor and a pH of 6.5, the current concentration should be less than 4.5 amps/litre at 50° C. or less than 3 amps/litre at 35° C. The current concentration (in amps/litre) is the main determining factor in calculating the reacting chamber volume. The retention time, on the other hand, is dependent on the rate of the liquor circulation, as well as on the volume of the reaction vessel. For convenience, the reaction vessel is divided into two vessels, i.e. degasifier-reactor 18 and header-reactor 19, which will be described hereinafter.

The particular arrangement of the degasifier-reactor 18 enables it to be used as a liquor seal for the cell gases carried off through line 16 by extending line 17 into the liquor in degasifier-reactor 18. In addition, the degasifier-reactor 18 is provided with a vent line 20 where gases which have been released from the liquor are combined with the gases in line 16 and may be vented as waste, or may be oxidized, as will be described hereinafter.

The liquor entering the degasifier-reactor 18, in a preferred embodiment, has a temperature of about 45° C. The effluent liquor from degasifier-reactor 18 passes via line 21 to pump 22 to the heat exchanger 23 where it is cooled to maintain the desired outlet temperature from cell 13 which may, in one example, be about 45° C. The pump provides the enforced circulation to overcome the drag of the heat exchanger and pipe lines. The effluent from the heat exchanger 23 passes via line 24 to the header-reactor 19.

Header-reactor 19 is a second reacting chamber where Equation 5 takes place. Care is taken to avoid short circuiting and channelling to maintain a constant reaction or retention time. It is important to control precisely the temperature in header-reactor 19. The higher the temperature, the lower the volume of the header-reactor 19, with its attendant upsetting of the retention time. A longer retention time favours the desirable reaction $$NaOCl + 2HClO \rightarrow NaClO_3 + 2HCl$$

It is also important to minimize the concentration of the hypochlorite for if it is too high it will decompose, as shown in Equation 8.

In addition, the pH must be less than 7 and preferably between about 5 and 7. At a pH of 6.8, the optimum reaction of two moles of HClO to 1 mole NaOCl takes place.

It is also noted that the header-reactor 19 serves, in addition to being a reaction vessel, as a header and pipeline for the recycle of the liquor.

From the header-reactor 19, the liquor proceeds via line 12 to the cell 13.

A branch line 25 leads from degasifier-reactor 18 to a filter 26, where particles of graphite are filtered out, and then through line 27 to a chlorate storage tank 28. It is preferred that a recycle rate of from 200:1 to 500:1 takes place, i.e. 200 to 500 parts recycled for each part to storage.

If it is desired to oxidize the gases from lines 16 and 20, it is noted that the gases have the following ranges of proportions:

| | Percent by volume |
|---|---|
| Hydrogen, ($H_2O$) | 89–94 |
| Water vapor, ($H_2O$) | 3–6 |
| Oxygen, ($O_2$) | 2–4 |
| Carbon dioxide, ($CO_2$) | 0.3–3.6 |
| Chlorine, ($Cl_2$) | 0.2–1 |

In combusting the gases, the following reaction will take place:

$$H_2 + Cl_2 \rightarrow 2HCl \text{ (producing hydrogen chloride)}$$
$$2H_2 + O_2 \rightarrow 2H_2O \text{ (producing water vapor)}$$

The hydrogen chloride is recovered as hydrochloric acid by scrubbing with water. The excess hydrogen is recovered by absorbing the $CO_2$ in an absorbent and then dehydrating the residual gas.

It is generally known that the oxygen content of the cell gas decreases with lower pH of electrolyte simultaneously as chlorine losses increase. Using a combustion chamber for recovery of chlorine losses as hydrochloric acid the cell may be operated at low pH and thus benefit by resulting improved current efficiency as well as lower electrode consumption. In fact, as shown in FIG. 1, chlorine may be added to the cell gases through line 29 for complete combustion of all hydrogen to hydrochloric acid and water vapor. The residual gas, mainly containing water vapor and carbon dioxide may be partly recirculated for control of hydrogen and chlorine concentrations to avoid an explosive gas composition.

The various embodiments and variants of aspects of this invention shown in FIGS. 2 to 11 inclusive represent improvements in or modifications of the system as previously described with respect to FIG. 1. They include all the advantages described with reference to FIG. 1, as well as other advantages which will become apparent from the following description.

Turning to FIGS. 2 and 3, it is seen that the system includes an electrolytic cell indicated generally by reference numeral 30. This electrolytic cell preferably is the electrolysis apparatus disclosed in Canadian Pat. No. 741,778, issued Aug. 30, 1966, to Göthe O. Westerlund, although other electrolytic cells may be used. The electrolytic cell is provided with liquor inlet means 31 and outlet means 32 for liquor and entrained and/or entrapped gases. The liquor and entrained and/or entrapped gases are conveyed via outlet conduit 33 to a degasifier 34. Degasifier 34 includes inlet means 35. The degasifier is operated in such a way that the liquor and entrained and/or entrapped gases cascade from the conduit 33 through the inlet means 35 into the degasifier 34, preferably tangentially to the degasifier 34, to provide a liquor zone in the lower section of the degasifier 34 and a gaseous zone atop the degasifier 34. By operating the degasifier under these particular conditions, and designing the degasifier for the appropriate liquor velocity considering the gas bubble size, 99% or more of the entrained and/or entrapped gaseous products of electrolysis may be separated from the effluent liquor. The degasifier is also provided with a pressure relief means or bursting discs, and an outlet means 36 for the separated gases. The separated gases are conveyed through gas line 38 to a scrubber 39, which is, in turn, provided with gas inlet means 40, and scrubbed gas outlet means 41. The scrubbed gas passes through outlet line 42 to a gas vent or storage means 43. The scrubbed liquor if it is, for example, caustic, may be recirculated to build up the hypochlorite concentration and then be returned to the reactor.

The substantially gas-free liquor in the degasifier 34 passes downwardly through effluent means 37 and is conducted via liquor inlet line 44 to a reactor 45, through the reactor inlet means 46. The reaction is permitted to proceed in the reactor 45, and the products of reaction along with the reacting liquor pass out of reactor 45 through liquor effluent means 47, which is positioned near the bottom of the reactor 45 by means of a baffle or pipe insert 48. The effluent from the reactor 45 is conducted by means of interconnecting conduit 49 to a second reactor 50, through second reactor liquor inlet means 51.

Further reaction then takes place in the second reactor 50, and the effluent passes out of second reactor 50 through liquor effluent means 52, positioned near the bottom of reactor 50, and defined by a baffle or pipe insert 53. The effluent liquor passes through liquor effluent conduit 54 to a surge tank 55 which is open to the atmosphere.

The surge tank 55 is so constructed that the liquor inlet means 56 to the surge tank 55 is somewhat below the liquor level 57. Liquor is withdrawn from the surge tank 55 by means of a positive displacement pump 59 connected to liquor effluent means 58 by liquor outlet conduit 60. The pump 59 then discharges the effluent through a main return conduit 61.

The main return conduit 61 includes, as an optional characteristic, a first branch line 62 leading to the degasifier 34. The inlet to the degasifier 34 from the first branch line 62 is in the form of a spray nozzle 63. This spray nozzle may, therefore, be used to spray liquor as a defoamant onto any foam that may be formed within the degasifier 34.

The main return conduit 61 also includes a second branch line 64, in which is disposed a filter mechanism 65. The filter mechanism is provided with product liquor inlet means 66, and filtered product outlet means 67. The filtered liquor is conducted via filtered product liquor conduit 68 to the liquor inlet 70 of a chlorate solution storage tank 69. The chlorate solution may be withdrawn, at will, via product liquor effluent line 71.

The main return conduit 61 is also provided with a third branch line 72 leading to a salt saturator 73, the liquor being admitted to the salt saturator 73 via liquor inlet means 74. The liquor contained in the salt saturator 73 may be brought up to the required strength, i.e. increased in concentration, by the addition of salt through a salt inlet hopper 75. The liquor which has been rejuvenated then passes out through brine outlet means 76 to a brine outlet line 77 which joins main return conduit 61.

Main return conduit 61 has, disposed in its path, a heat exchanger 78 including liquor inlet means 79 and liquor outlet means 80. The conventional liquid inlet lines and outlet lines to and from the heat exchanger have been omitted from this drawing for the interest of simplicity.

The liquor which has been brought to the required temperature, and the rejuvenated liquor from the salt saturator are then conducted via main return conduit 61 to liquor inlet means 31 for recycling through the system as previously described.

One particular advantageous orientation of the elements shown in FIG. 2 is shown in idealized top plan view in FIG. 3. It is seen in FIG. 3 that a U-shaped closed loop system is provided between the outlet conduit 33 from the electrolytic cell 30 to the main return conduit 61 to the electrolytic cell 30. Thus, there is provided, in the outward going leg, the outlet conduit 33, the degasifier 34, the liquor inlet line 44, the reactor 45, and the interconnecting conduit 49. The return leg includes the reactor 50, the liquor effluent conduit 54, the surge tank 55, the first portion of the main return conduit 61, the heat exchanger 78, and the final portion of the main return conduit 61. This orientation provides a very compact and thus economical system of elements.

Turning now to FIGS. 4, 5 and 6, there is shown in those figures one embodiment of an apparatus designed to be used in the system of various aspects of this invention. The reactor, indicated generally as 90, includes a primary reaction chamber 91 and a secondary reaction chamber 92, separated one from the other by means of a baffle 89 extending from the top of the reactor 90 to almost the bottom of the reactor 90 to provide a chordal-shaped effluent from the primary reacting chamber to the secondary reactor chamber 92. In one particularly preferred embodiment, the primary chamber occupies 25% or less of the volume of the reactor tank 90, and the secondary chamber 92 correspondingly occupies 75% or more of the volume of the reactor tank 90. The baffle 89 preferably extends downwardly from the top of the tank by an amount of 90% or more of the height of the tank. At least one inlet to the primary reactor chamber 91 is provided. In the embodiment shown in FIGS. 4, 5 and 6, three such inlet means for liquor and entrained and/or occluded gas is provided, namely first inlet means 93, second inlet means 94 and third inlet means 95. The inlet means are connected respectively to first inlet conduit 96, second inlet conduit 97, and third inlet conduit 98. The conduits 96, 97 and 98 are so connected to the inlet means 93, 94 and 95 respectively that the upper portions of the conduits are, in effect, gas-separation domes leading to first gas outlet line 99, second gas outlet line 100, and third gas outlet line 101 respectively.

The substantially gas-free liquor follows the path of the arrows shown in FIG. 6, and passes under the baffle 89 from the primary reactor chamber 91 to the secondary reactor chamber 92. The secondary reactor chamber is provided with a surge and head tank 102 capping one end of the secondary reactor chamber 92. The surge and head tank 102 is provided with a tangentially disposed overflow liquor effluent conduit 103, and a product outlet line 104.

In the system shown in FIG. 7 which employs the reactor embraced by FIGS. 4, 5 and 6, the outlet conduit 33 from the electrolytic cell 30 is connected to the first liquor and entrained and/or entrapped gas inlet conduit 96 which passes to the liquor and entrained and/or entrapped gas inlet means 93. The inlet means 93 acts as a gas-separation dome, and the gases separated from the liquor are withdrawn through gas outlet line 99. The substantially gas-free liquor passes down the primary reactor chamber 91 and into the secondary reactor chamber 92. Reacted products then overflow from the secondary reactor chamber 92 to the surge and head tank 102. From the surge and head tank, an overflow of liquor passes through tangential overflow and liquor effluent conduit 103, to join liquor outlet conduit 60 in passing to the positive displacement pump 59. From the positive displacement pump 59, the liquor is pumped through a first portion of the main return conduit 61, through a heat exchanger 78, and then by the terminal portion of the main return conduit 61 back to the electrolytic cell 30.

The embodiment shown in FIG. 8 differs from the embodiment shown in FIG. 7 in that a salt saturator line is also provided. Thus, the first portion of the main return conduit 61 includes the third branch line 72 which leads the liquor to a salt saturator 73. The salt saturator 73 is provided with the brine outlet line 77 which conveys the rejuvenated liquor to the terminal portion of the main return conduit 61, for return to the electrolytic cell 30.

Another embodiment of this invention is shown in FIG. 9. Here there is shown two separate systems, namely system I and system II which may be operated either individually, alternately, or together in integrally united form. In addition, further systems, namely systems III, IV, etc. may be added to the two systems there shown in order to provide additional comprehensive chlorate production systems.

As shown in FIG. 9, system I includes electrolytic cell number 1, namely 110, and electrolytic cell number 2, namely 112. Although two cells are shown, it is not necessary for both cells to be operating simultaneously. It is possible to operate the cells individually, or alternately. In addition, more than two such electrolytic cells can be used, provided additional gas-separation means are provided.

System I includes a first reactor 1a, namely 114, provided with a pair of gas-separation dome and inlet conduits 116, 118. These gas-separation dome and conduits are fed by liquid and entrained and/or occluded gas conduit 120, from electrolytic cell number 1, namely 110, to gas-separation dome and inlet conduit 116, and liquor and entrained and/or occluded gas conduit 122 from electrolytic cell number 2, namely 112, to gas-separation dome and inlet conduit 118.

Leading from gas-separation dome and inlet conduit 116 is a gas-conducting line 124, and leading from gas-separation dome and inlet conduit 118 is a second gas-conducting line 126. Gas-conducting lines 124, 126 lead to a pressure equalization dome and/or liquor seal for the gas lines 128, which leads in turn to a gas scrubber 130. The gas scrubber includes a scrubbed gas outlet 132. In addition, it is provided with a scrub liquor outlet line 134, a scrub liquor inlet line 136 and a scrub liquor recirculation pump 138 disposed in the closed loop between the inlet to the gas scrubber 130 and the outlet from the gas scrubber 130. A line 140 is provided for the introduction of fresh scrub liquor, which preferably is 20% sodium hydroxide to the scrubber.

Reactor Ia, namely 114, is also provided with a pair of inlet lines 142, 144. Inlet line 142 is for the introduction of hydrochloric acid to the reactor, the hydrochloric acid preferably being 16% in strength. Inlet line 144 is for the introduction of chromate into the reactor 114, the chromate preferably being in the form of $Na_2Cr_2O_7$. Reactor Ia, namely 114, is provided with an interconnecting line 146 leading to reactor Ib, namely 148. In turn, reactor Ib, namely 148, is provided with a liquor outlet conduit 150 leading to a surge tank I, namely 152.

Surge tank I, namely 152, is also fed with scrub liquor from the scrubber 130 through a conduit 154. As an alternative, conduit 154 may be discharged either into reactor 114 or reactor 148. Overflow from the surge tank is conveyed from overflow conduit 156 to a pump/auxiliary tank 158 where it is stored. It is then withdrawn from the pump/auxiliary tank 158 by a positive displacement pump 166 through liquor effluent line 160. The liquor from the pump/auxiliary tank 158 is intermingled with process drain liquor conveyed to a sump 164 via process drain lines 172 and then via liquor effluent line 162 from the sump. The positive displacement pump 166 then propels the liquor through line 168 to recharge liquor line 170 which leads back to the surge tank (I), namely 152.

Surge tank (I), namely 152, is also provided with a liquor outlet line 174 which leads to a positive displacement pump 176 which pumps liquor into recycle line 184, and also to liquor return line 178. Liquor return line 178 leads to a salt saturator 180. In turn, the salt saturator 180 is provided with a brine and liquor return line 182 which joins recharge liquor line 170 at its point of convergence with liquor line 168.

Recycle line 184 leads through a heat exchanger 186 and then the liquor whose temperature has been regulated by the heat exchanger 186 passes through liquor recycle line 188 to the liquor inlet line 190 feeding electrolytic cell number 1, namely 110, and also to liquor inlet line 192 feeding electrolytic cell number 2, namely 112.

Heat exchanger 186 is provided with a coolant inlet line 194 and a coolant outlet line 196. Coolant inlet line 194 is fed from liquid inlet means 200, and coolant outlet line 196 discharges to coolant outlet drain 202. A pressure booster pump 198 provides a means for recirculating part of the coolant, and thus tempers the inlet coolant to prevent crystallization in the heat exchanger 186.

System II is similar to system I in many respects, although it differs in some. It includes an electrolytic cell number 3, namely 111, and an electrolytic cell number 4, namely 113. It also includes a first reactor IIa, namely 115, which is provided with a gas-separation dome and liquor inlet 117 and a second gas-separation dome and liquor inlet 119. Electrolytic cell number 3, namely 111, is provided with a liquor and entrained and/or entrapped gas line 121 which leads to gas-separation dome and liquor inlet 117, while electrolytic cell number 4, namely 113, includes a line 123 for effluent liquor and entrained and/or entrapped gases which leads to the second gas-separation dome and liquor inlet 119. Gas-separation dome and liquor inlet 117 includes a gas-conducting line 125 leading to the hereinbefore described pressure equalization dome and/or liquor seal for the gas lines 128, while gas-separation dome and liquor inlet 119 includes a gas-conducting line 127 which also leads to the pressure equalization dome 128.

In addition, reactor IIa, namely 115, includes an inlet line for hydrochloric acid 143, and an inlet line for chromate 145, similar to inlet line 142 and 144 respectively for reactor Ia, namely 114. Reactor IIa, namely 115, includes an interconnecting line 147 for conducting liquor from reactor IIa, namely 115, to reactor IIb, namely 149. In turn, reactor IIb, namely 149, including a liquor outlet conduit 151 which leads to a surge tank II, namely 153.

Surge tank II, namely 153, includes an overflow conduit 157 which joins overflow conduit line 156 previously described, and leads to the previously described pump/auxiliary tank 158. Surge tank II, namely 153, also includes a recharge liquor line 171 which is joined to the hereinbefore described liquor return line 178; in this way, the liquor in system II is maintained at the proper strength by the interconnection of system II with system I at a point where rejuvenated liquor has been provided.

Surge tank II, namely 153, finally is provided with a liquor outlet 175 which is fed to a positive displacement pump 177. The effluent from the positive displacement pump 177 is fed via recycle line 185 to a heat exchanger 187. The effluent from the heat exchanger 187 is conducted via liquor recycle line 189 to a liquor inlet line 191 feeding electrolytic cell number 3, namely 111, and also to liquor inlet 193 feeding electrolytic cell number 4, namely 113. The heat exchanger 187 is provided with coolant, e.g. cooling water, inlet line 195 connected to coolant, e.g. cooling water, inlet means 200, and a coolant, e.g. cooling water, outlet line 197, connected to coolant, e.g. cooling water, outlet drains 202. The system may also include a pressure booster pump 198 to circulate part of the coolant, e.g. cooling water, to temper the inlet coolant, e.g. cooling water.

System I and system II are further interconnected by means of a spare circulating pump 135. Thus, a branch line 129 is provided from liquor outlet line 174, and a second branch line 131 is provided from liquor outlet line 175, merging into a common branch line 133 fed to a positive displacement pump 135. Branch lines 129 and 131 respectively are provided with shut-off valves; thus either of the aforesaid lines may feed spare pump 135. The effluent from the positive displacement pump 135 is pumped into header line 137 which is connected to liquor circulating lines 184 and 185. Shut-off valves are provided on header 137 at each junction 184 and 185; thus, the spare pump provides an alternative for both pumps 176 and 177. The withdrawal of product may thus be from system I and/or system II. Thus, a branch line 141a is connected to header line 137 feeding liquor to pressure booster pump 139, whose effluent is discharged via product line 141b to filtration system 155. The effluent from the filtration system passes through filter product effluent line 159 to a branch line 161 and a second branch line 163. First branch line 161 leads to product storage I, namely 165, while second branch line 163 leads to product storage tank II, namely 167. Effluent may be withdrawn from product storage I, namely 165, through product outlet conduit 169 while product may be withdrawn from product storage II, namely 167, through product outlet conduit 173. The outlet conduits 169 and 173 merge into a common product outlet conduit 179.

Figure 10:
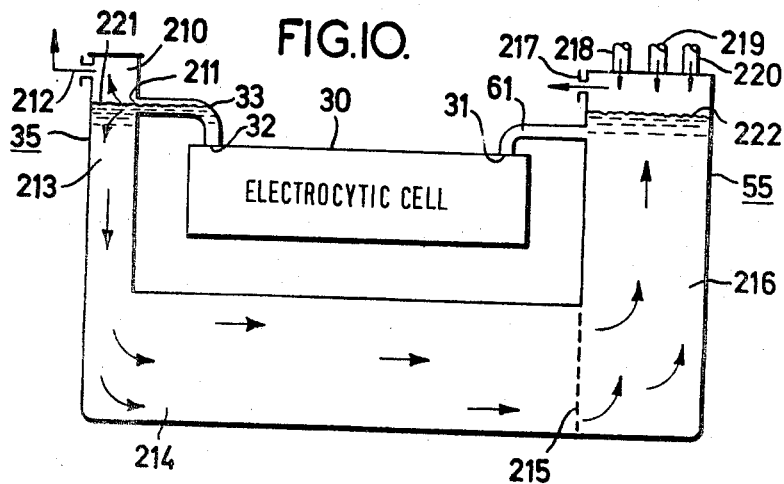
FIG. 10 is a schematic side elevational flow diagram of a system for chlorate manufacture according to yet another aspect of this invention.
Figure 11:
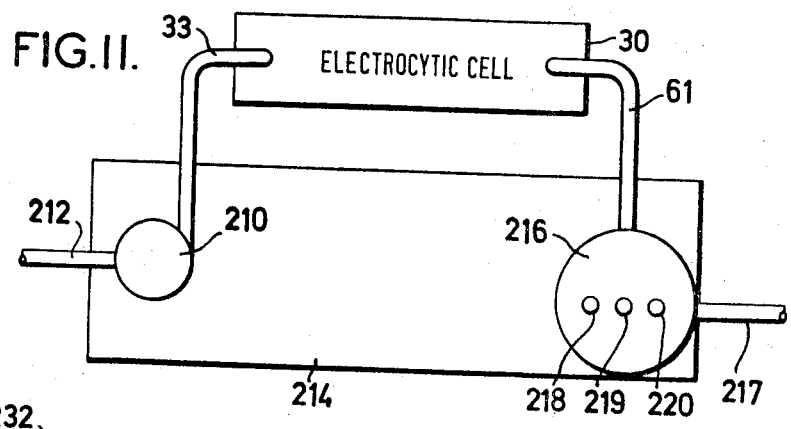
FIG. 11 is a schematic top plan flow diagram of a system for chlorate manufacture according to a still further aspect of this invention.
Figure 12:
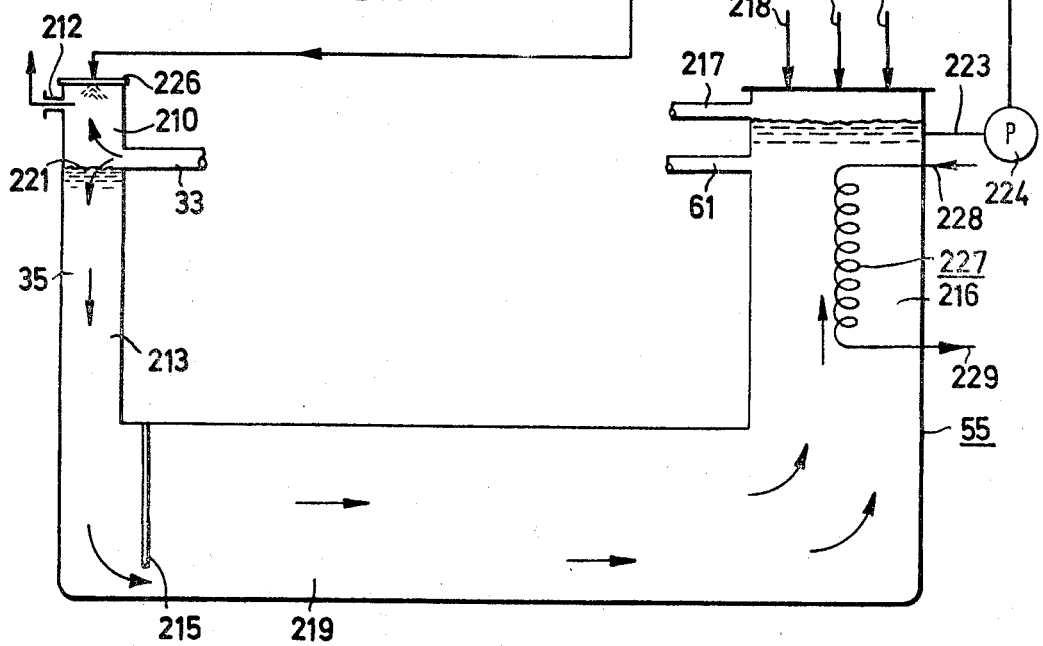
FIG. 12 is a schematic side elevational view of another unitary reactor according to a still further aspect of this invention.

FIGS. 10, 11 and 12 show other embodiments of this invention. In FIGS. 10 and 11, the electrolytic cell 30 is provided with an outlet means 32 for liquor and entrained and/or entrapped gases which passes through outlet riser and conduit 33 to the degasifier 35. The degasifier 35 is fed in such a way via inlet 211 as to provide a gas zone 210 above the inlet 211 and a liquor zone 213 below the inlet. Released gases are withdrawn from the gas zone 210 through gas outlet line 212. The level of the liquor in the degasifier when operating is shown at 221.

The substantially gas-free liquor in the lower part of the degasifier 213 passes downwardly and then horizontally through a lower reactor 214, and then upwardly to a surge tank 55. In order to provide control of flow, a baffle 215 may be provided between the reactor 214 and the surge tank 55. The surge tank 55 includes a liquor zone 216, whose level is shown at 222. The liquor level 222 in the surge tank 55 is normally somewhat lower than in the degasifier (level 221) because of the gas entrained especially in the upper part of the degasifier 213. The flow of liquor indicated by the arrows is created principally by the up-lift in the riser conduit 33, and the flow rate will depend on a number of factors, principally, the height of the riser, the cross-sectional area of the riser and the amount of gas entrainment. The surge tank 55 is provided with an outlet conduit connected to main return conduit 61 which leads to the liquor inlet means 31 of the electrolytic cell 30. In addition, the surge tank 55 is provided with an overflow inlet line 217 for overflow from the surge tank 55.

Fresh reactants are fed to the system through inlet lines to the surge tank 55. Three inlet lines are provided, namely 218, 219 and 220. Inlet line 218 is for the addition of water and muriatic acid, inlet line 219 is for the addition of dichromate, and inlet line 220 is for the addition of salt and/or brine.

FIG. 12 shows a further modification of the reactor shown in FIGS. 10 and 11. In this modification, a liquor branch line 223 from the surge tank 55 is provided leading to a positive displacement pump 224. The effluent from the positive displacement pump 224 is fed through defoamant conduit 225 to a spray nozzle 226 disposed in the gas zone 210 of the degasifier 35.

In addition, the upper zone 216 of the surge tank 55 is provided with a heat exchanger 227, the heat exchanger including coolant inlet 228 and a coolant outlet 229.

The cell off-gases from the degasifier 210 in FIGS. 10 and 12 are fed, as shown in FIG. 2, to a scrubber 39, and thence to storage 43. Alternatively, the scrubbed gas may be vented after emerging from the scrubber 39. One embodiment of a scrubbing apparatus and system has been described with reference to FIG. 9. Yet another embodiment of such scrubbing apparatus and system is shown diagrammatically in FIG. 13.

Figure 13:
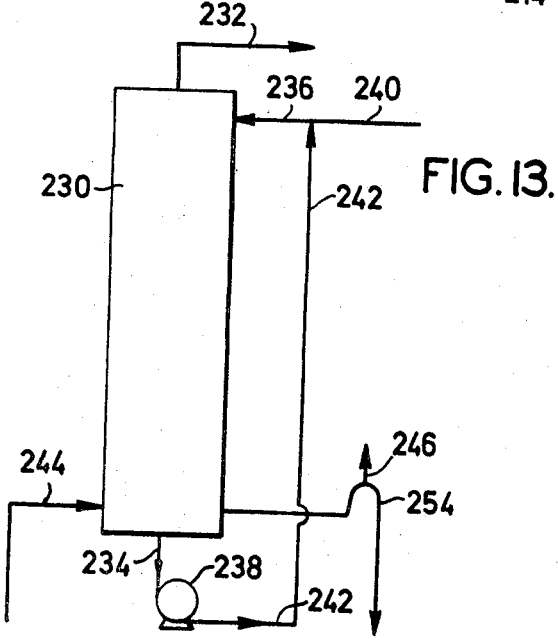
FIG. 13 is a schematic side elevational flow diagram of a scrubbing apparatus and system of yet another aspect of this invention.

As shown in FIG. 13, the cell off-gases (from the degasifier 210 of FIGS. 10 and 12, for example) are conducted through line 244 to the scrubber 230. There, the gases are scrubbed with scrubbing liquor entering through inlet line 236. The upwardly moving gases are scrubbed by the downwardly moving liquor according to a counter-current technique well known to those skilled in the art. Scrubber gases continue upwardly and are conducted away from scrubber 230 via gas outlet line 232. The line 232 may lead to a storage tank (not shown) or to a vent valve (also not shown).

Scrub liquor continues downwardly and is removed from the scrubber 230 through outlet conduit 234 to a pump 238, by which it is recycled, via recycle line 242 to liquor inlet line 236. Liquor is maintained at strength through make-up scrub liquor line 240.

A second scrub liquor outlet line 254 near the bottom of the container 230 is provided to conduct liquor from the scrubber. The liquor removed from the scrubber 230 may be vented via vent 246 and later conducted, in a preferred embodiment, to the electrolytic cell 30, since it comprises substantially saturated scrub liquor.

As pointed out before, the cell off-gases normally consist of $H_2$, $H_2O$ (vapor), $O_2$, $CO_2$ and $Cl_2$, principally hydrogen. It is often desirable to scrub the gases to recover a selected one of the constituents. For example, since chlorine is more water soluble than the other gases, scrubbing with water will absorb a substantial portion of the chlorine, so that air pollution is lessened should the scrubbed gases be vented. The concentration of chlorine in the water is usually so low that the product is discarded, i.e. flushed down a sewer.

Alternatively, the cell off-gases may be scrubbed with caustic solution. The chlorine then reacts with the caustic to produce hypochlorite ions and chloride ions. The scrubber liquor may then, in accordance with an aspect of this invention, be returned to the chlorate production system. Hypochlorite, in neutral or slightly acidic solution, then reacts to produce chlorate ions and chloride ions, according to the equation $3ClO^- \rightarrow ClO_3^- + 2Cl^-$.

It will be observed that carbon dioxide will also be absorbed by the alkali scrubbing solution. However, due to the geometry of the scrubbing system, the absorbed carbon dioxide will be desorbed, and be removed with the scrubbed gases.

Thus, this aspect of the present invention provides a dual advantage. On the one hand, if it is desired to vent the gases, the removal of the chlorine results in a lessening of air pollution. On the other hand, the scrub liquor may be introduced into the chlorate producing system, thereby utilizing otherwise wasted chemicals and improving chlorate efficiency. In either case, the discharged gases are purer with respect to hydrogen than prior to scrubbing.

Figure 14:
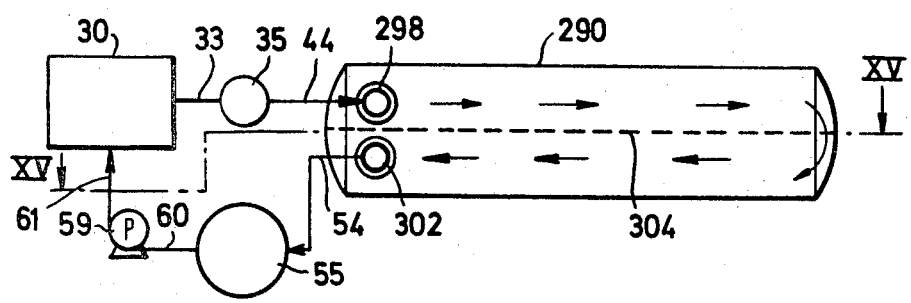
FIG. 14 is a schematic top plan diagram of a system for chlorate manufacture according to yet another aspect of this invention showing an alternative construction of the unitary reactor.
Figure 15:
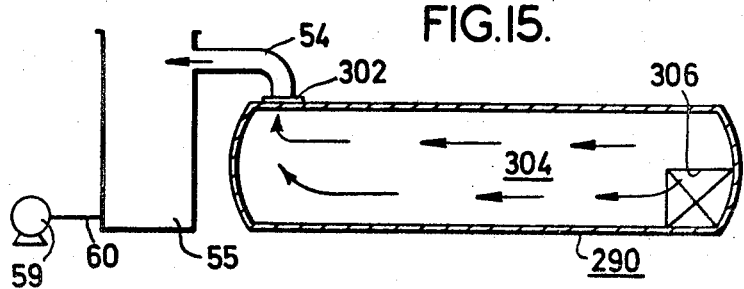
FIG. 15 is an idealized section along the line XV—XV of FIG. 14.

As seen in FIGS. 14 and 15, the liquor products from the electrolytic cell 30 are conveyed via line 33 to the degasifier 35 and the essentially gas-free liquor is then fed via line 44 to the inlet connector 298 of a reactor indicated generally as 290. Liquor leaves reactor 290 via outlet connector 302 and via line 54 to a surge tank 55. From surge tank 55 it is led via line 60 to pump 59 by which it is pumped, via line 61, back to reactor 30.

Reactor 290 differs from the reactors heretofore described hereinabove in that it is provided with a vertical, longitudinally extending dividing wall 304, provided at its lower end remote from inlet connector 298, with a connecting opening 306. This dividing wall 304 may be used to channel the liquor between the inlet connector 298 and the outlet connector 302, as shown by the arrows in FIGS. 14 and 15.

Alternatively, dividing wall 304 may itself be a member for cooling the liquor. Thus, dividing wall 304 may be a double wall, i.e. a pair of spaced apart walls, with coolant means circulating therebetween. On the other hand, if wall 304 is a single wall, cooling coils may be supported thereon, with coolant circulating within the tubes.

As has been described, there are special advantages of the designs covered by FIGS. 2 to 11 inclusive. The designs provide, in one feature, a fully enclosed loop system (except for the surge tank which may optionally be covered but which preferably does communicate with the atmosphere via a carbon filter or through a scrubber if desired). This complies with modern standards for control and pollution abatement. The design provides in another feature, for maximum safety coupled with minimum hazards. This is due principally to the fact that the design provides for degasifying outside the cell container in a confined area, while discharging liquor into a liquor-filled reactor which overflows to another reactor and/or surge tank. Thus, since the cell gas is confined in a pipe from the cell container to the degasifier, it is present mainly in the degasifier and is present only to a very minor amount (less than 1%) in the reactor, it significantly reduces the hazard from gas fires and/or explosions. In addition, the system provides for the recovery of the cell off-gases. Furthermore, the closed loop system protects the operator from liquor contact and hazard from same.

In a preferred but not necessarily essential feature, the system includes a spray nozzle in the degasifier for defoaming by means of a chlorate liquor spray or other analogous flow distribution means. Thus, overpressures in the gas line and in the system tend to be avoided, and slower production rates caused by foaming conditions tend to be minimized.

In yet another feature, the design provides for easy process control since the process flow is clearly defined.

In another feature of this invention, the system is designed for minimum piping, thus lowering power costs and minimizing maintenance costs.

An important feature of this invention is the provision of the surge tank which allows for volume changes in the system, to accommodate current load changes, to acccommodate temperature changes, to accommodate liquor composition changes, and to accommodate batch operation instead of continuous operations, if so desired.

Another important feature of this invention is the provision of a closed loop system including forced circulation.

In the system as particularly shown in FIGS. 6 and 7, the degasifier could be discharged directly into the surge tank which would then serve both as a reactor and as a surge tank.

Another feature of the system resides in the discharge pipe of the electrolytic cell container. This pipe-riser actually becomes a pump because of the entrained cell gases in the liquor. As a result, the required forced circulation through the system may be fully achieved without external power by this intrinsic pumping action. The flow rate will then depend, for example, upon design conditions such as diameter and height of pipe-riser, the current load to the cells which represents gas evolution rate, and pressure drop through the system. In this case, the liquor level elevation would be higher in the degasifier than in the surge tank since the flow would be caused by the head of liquor in the degasifier.

An important feature of this invention now resides in the use of horizontal reactors designed for overflow, i.e. they are completely liquor filled with liquor for the elimination of explosion hazards from gaseous products.

The cell products (liquor with gaseous products) are discharged into a dome which is located on top of the reactor. This dome may, however, be located at the electrolytic cell as well as any place between the electrolytic cell and reactor. The gaseous products are separated in this dome and discharged at the top to a scrubber or at atmosphere. The dome may also include a spray nozzle in order to break down foam, if and when this should occur.

In this embodiment, the liquor flows to the first reacting chamber, along the chamber then overflows to a second chamber and overflows again to a volume surge tank. The layout is such to minimize piping.

One system or more could be employed; disclosed herein are two systems which may be operated separately or in cascade.

Another feature of this invention provides a reactor which combines (a) a dome for gas separation; (b) a primary section wall to provide a liquor path to bottom of tank; and (c) a volume "surge and head chamber" on secondary section of reacting chamber.

In one specific aspect of this invention, the electrolytic cells are operated to produce, continuously, a sodium chlorate liquor which can be used directly in commercial chlorine dioxide generators. The electrolytic cells used herein are designed to create a high internal liquor circulation rate which is promoted by convection currents and a "gas-lift" action. The process also achieves a high external recirculation of electrolyte which optimizes power consumption, achieves good heat transfer conditions and facilitates compact design. The electrolytic cell is designed to operate liquid-full, eliminating any hazard from cell gas explosions. It does not employ air dilution so that the off-gas does not enter into the flammable range. This feature gives the added advantage of having a stream of a high concentration of hydrogen for re-use.

In one specific aspect, a series of tanks, the first two of which operate liquid-full, are provided to give retention time for the completion of the chemical conversion of sodium hypochlorite and hypochlorous acid to chlorate. Prior to entering the first tank in the series, the liquor is fed to a gas separator where substantially all the electrolytically-produced gases are removed. The removed gas is scrubbed to remove traces of chlorine which are present therein as a minor component, and is then either released to atmosphere, used to make hydrochloric acid or otherwise used for its fuel value. The scrubbing system is greatly simplified because dilution air is not used, the gas volume is considerably less and the driving force for absorption is considerably higher.

A portion of the recirculating electrolyte is passed through a salt saturator where it picks up salt. This makes it possible to produce a high concentration of chlorate in the solution as well as help minimize power consumption.

The heat given off by the electrolysis is removed from the system by heat exchangers. The cooling water is not fouled by these units allowing complete re-use of the water making available the additional heat it has obtained. The heat pick-up is in the order of 15,000,000 B.t.u./ton of chlorate. The cooling water is tempered in the system to eliminate the chance of freezing the electrolyte in the heat exchangers.

From the foregoing description, one skilled in the art can easily ascertain the essential characteristics of this invention and without departing from the spirit and scope thereof can make various changes and modifications of the invention to adapt it to various usages and conditions. Consequently, such changes and modifications are properly, equitably and intended to be within the full range of equivalence of the following claims:

I claim:

1. A forced circulation, closed loop system for effecting an electrolysis reaction and recovering subsequently reacted products of electrolysis comprising:
    (1) an electrolytic cell provided with liquor inlet means and outlet means for liquor and entrained and/or entrapped gaseous products of electrolysis;
    (2) degasifier means connected to said outlet means and constructed and arranged to remove at least 99% of the entrained and/or entrapped gaseous products of electrolysis from the liquid primary products of electrolysis, said degasifier means including
        (i) outlet means for the separated gases, and
        (ii) effluent means for the substantially gas-free liquor;
    (3) reactor means including liquor inlet means and liquor outlet means, the liquor inlet means being fed from effluent means (2)(ii), said reactor means being so constructed and arranged as to be substantially full of said substantially gas-free liquor during the course of the reaction of the liquid primary products of electrolysis and to provide sufficient retention time to effect such reaction;
    (4) surge tank means incluidng liquor inlet means and liquor outlet means, the liquor inlet means being fed from overflow from the liquor outlet means of the reactor means, for accommodating liquor volume changes in the system;
    (5) conduit means from the liquor outlet from the surge tank to the electrolytic cell liquor inlet means; and
    (6) liquor temperature varying means disposed in the conduit means (5) for controlling the temperature of the liquor fed to the electrolytic cell.

2. The system of claim 1 wherein the degasifier means is disposed outside of, but close to, the electrolytic cell.

3. The system of claim 1 wherein the degasifier means is disposed atop, and directly connected to, the reactor means.

4. The system of claim 1 wherein the reactor means includes two interconnected reaction vessels, the interconnection permitting the second reactor to be fed from overflow from the first reaction vessel, while maintaining the second reaction vessel substantially liquor full.

5. The system of claim 1 wherein the reactor means comprises:
    (a) a dome for the separation of gas from a liquid;
    (b) inlet means to the top of the dome;
    (c) a main horizontally disposed reactor interconnected with the dome;
    (d) outlet means from the top of the main horizontal reactor; and
    (e) additional reactant inlet means to the main horizontal reactor.

6. The system of claim 5 wherein said main horizontally disposed reactor is divided into:
    (i) a primary chamber occupying 25% or less of the volume of the reactor tank, and
    (ii) a secondary chamber occupying 75% or more of the volume of the reactor tank by means of a:
    (iii) dividing wall, in liquid-tight engagement with the sides and top of the enclosed tank and extending downwardly from the top of the tank by an amount of 90% or more of the height of the tank.

7. The system of claim 5 wherein said main horizontally disposed reactor is divided into a pair of interconnected reaction chambers by means of a vertical, longitudinally extending wall, having an opening at one end remote from the inlet means to the reactor.

8. The system of claim wherein said dividing wall is provided with heat exchanger means adapted to have coolant circulating therein.

9. The system of claim 8 wherein said dividing wall comprises a pair of spaced apart walls adapted to have coolant circulating therebetween.

10. The system of claim 1 wherein the reactor means and the surge tank means are provided by a unitary vessel.

11. The system of claim 10 wherein said degasifier-reactor-surge tank means includes:
    (I) inlet means, fed from the outlet means from the electrolytic cell container, leading to a degasifier zone portion of said means, the degasifier zone including an upper zone for released gases, leading to a gas outlet line, and a lower zone for a column of substantially gas-free liquor;
    (II) a reaction zone disposed below, and fed from said column of substantially gas-free liquor, the reaction zone being disposed in a horizontal inclination; and
    (III) a surge zone, disposed in a vertical inclination, fed from the horizontal reaction zone, the column of liquor in the surge zone being higher than the column of liquor in the degasifier zone, the surge zone having an outlet for liquor connected to the liquor inlet means of the electrolytic cell container.

12. The system of claim 11 wherein the discharge from the electrolytic cell container to the degasifier zone is tangential to said zone.

13. The system of claim 11 wherein the degasifier zone discharges directly into the surge zone, which therefore becomes a combined reaction zone and surge zone.

14. The system of claim 1 wherein the liquor temperature varying means is a heat exchanger.

15. The system of claim 1 including a first branch line from conduit means (5) to the degasifier means (2) for defoaming by means of a liquor spray.

16. The system of claim 1 including a second branch line from conduit means (5) for withdrawing a desired proportion of reactant liquor, the second branch line including a filter disposed therein, and a liquor storage means.

17. The system of claim 1 including a third branch line from conduit means (5) for passing a desired proportion of liquor through a salt saturator thereby to bring the reactant liquor up to required strength.

18. The system of claim 1 including a gas transporting line from the outlet means (2)(i), leading to a gas scrubber and gas storage means.

19. The system of claim 10 wherein said gas scrubber includes:
(a) gas inlet means adjacent the lower portion thereof;
(b) scrubbed gas outlet means adjacent the upper portion thereof;
(c) scrub liquor inlet means adjacent the upper portion thereof;
(d) scrub liquor recycle lines from adjacent the lower portion thereof to adjacent the upper portion thereof; and
(e) liquor outlet means leading from said gas scrubber to said electrolytic cell.

20. The system of claim 19 including vent means in the liquor outlet means (e).

21. A forced circulation, closed loop system for the electrolysis of a metal chloride and the production and recovery of a metal chlorate, which system comprises:
(I) an electrolytic cell for the electrolysis of an aqueous solution of a metal chloride, e.g. sodium chloride;
(II) a primary reactor, the primary reactor including:
(a) a dome for the separation of gas from a liquid,
(b) inlet means to the top of the dome,
(c) a main horizontally disposed reactor interconnected with the dome,
(d) outlet means from the top of the main horizontal reactor, and
(e) additional reactant inlet means to the main horizontal reactor;
(III) a fluid conduction line from the electrolytic cell to the dome for conducting liquor containing gaseous products dissolved and/or occluded therein from the electrolytic cell to the dome of the primary reactor;
(IV) a secondary reactor, such secondary reactor including:
(a) liquor inlet means at the top thereof, and
(b) outlet means from the top thereof;
(V) a liquor conduction line from the outlet (d) of the primary reactor (II) to the inlet means (a) of the secondary reactor (IV) for conducting liquor which overflows from the primary reactor (II) to the secondary reactor (IV);
(VI) a surge tank, the surge tank including:
(a) liquor inlet means thereinto, and
(b) liquor outlet means from the bottom thereof; and
(VII) a liquor-conducting line from the surge tank branching into two lines:
(a) a main line for recycling liquor back to the electrolytic cell, and
(b) a subsidiary line for conducting a desired proportion of the liquor to a product storage and/or recovery tank.

22. The system of claim 21 wherein said main horizontally disposed reactor is divided into:
(i) a primary chamber occupying 25% or less of the volume of the reactor tank, and
(ii) a secondary chamber occupying 75% or more of the volume of the reactor tank by means of a:
(iii) dividing wall, in liquid-tight engagement with the sides and top of the enclosed tank and extending downwardly from the top of the tank by an amount of 90% or more of the height of the tank.

23. The system of claim 21 wherein said main horizontally disposed reactor is divided into a pair of interconnected reaction chambers by means of a vertical, longitudinally extending wall, having an opening at one end remote from the inlet means to the reactor.

24. The system of claim 23 wherein said dividing wall is provided with heat exchanger means adapted to have coolant circulating therein.

25. The system of claim 24 wherein said dividing wall comprises a pair of spaced apart walls adapted to have coolant circulating therebetween.

26. The system of claim 21 including a gas scrubber to receive gas which is partly but primarily separated at the gas separation zone, and partly but secondarily separated by the primary reactor, said gas being treated in the gas scrubber with an alkali scrubbing liquid, the scrubbed gas including hydrogen therein being either vented to atmosphere or recovered for use, the concentrated scrub liquor therefrom being then conveyed to the reactor.

27. The system of claim 26 wherein the gas scrubber includes:
(a) gas inlet means adjacent the lower portion thereof;
(b) scrubbed gas outlet means adjacent the upper portion thereof;
(c) scrub liquor inlet means adjacent the upper portion thereof;
(d) scrub liquor recycle lines from adjacent the lower portion thereof to adjacent the upper portion thereof; and
(e) liquor outlet means leading from said gas scrubber to said electrolytic cell.

28. The system of claim 21 including a salt saturator for preparing sodium chloride brine for conduction to the surge tank, and including a recycle line from the surge tank for conducting liquor from the surge tank back to the salt saturator.

29. The system of claim 21 including a filtration system disposed in the subsidiary line for filtering liquor from a surge tank prior to conducting it to the product storage and/or recovery tank.

30. The system of claim 21 including a sump to receive liquor from all the process drains, leaks or spills, a dump/auxiliary tank to receive the overflow from the surge tank for conducting such liquor, as well as liquor from the sump, when required, to the brine inlet line to the surge tank.

31. The system of claim 21 including two electrolytic cells, and wherein a pair of gas separation domes is provided on the primary reactor, each dome being fed by liquor from one of the electrolytic cells.

32. The system of claim 31 in the form of a pair of interconnected systems, and provided with: firstly, a common salt saturator to provide fresh feed for each of the four electrolytic cells; secondly, a common filtration for filtering the liquor conducted in the subsidiary lines of each of the two interconnected systems, the filtration system leading to common product storage and/or recovery tanks; and thirdly, a common dump/auxiliary tank to receive the overflow from each of the surge tanks.

33. The system of claim 32 wherein the salt saturator is in the first of said pair of interconnected systems, and the salt solution so formed cascades into the second of said pair of interconnected systems, thereby providing higher chloride than in the preceding system.

34. The system of claim 1 wherein said reactor means is a unitary reactor tank comprising:
(A) a horizontally disposed enclosed tank divided into:
(i) a primary chamber occupying 25% or less of the volume of the reactor tank, and
(ii) a secondary chamber occupying 75% or more of the volume of the reactor tank by means of a:
(iii) dividing wall, in liquid-tight engagement with the sides and top of the enclosed tank and extending downwardly from the top of the tank by and amount of 90% or more of the height of the tank;
(B) an upstanding gas-separating dome superposed over the primary chamber and leading directly thereto to provide a liquid flow path from the dome to the primary chamber, the dome being provided with:
  (i) a liquor-conducting inlet conduit adjacent the mid-portion or higher of the gas-separating dome to conduct liquor containing entrained, entrapped and/or occluded gas to the gas-separating dome, and
  (ii) a gas-conducting outlet line connected to the top of the gas-separating dome to conduct gas separated from the liquor away from the gas-separating zone; and
(C) an upstanding surge and head tank superposed over the region of the secondary reactor remote from the dividing wall, such tank providing a direct liquor flow path from the secondary chamber, the surge and head tank including:
  (i) a liquor outlet conduit disposed above the level of the secondary chamber but near the bottom of the surge and head tank, thereby to provide means for the discharge of liquor overflowing from the secondary chamber, and
  (ii) a level control liquor outlet near the top of the surge and head tank, thereby to provide means for discharging overflow from the surge and head tank.

35. The system of claim 34 where said tank includes a foam break-down, spray nozzle in the gas separating dome (B).

36. The system of claim 34 wherein said tank includes an electrolytic cell having a liquor outlet connected to the gas-separating dome inlet, the liquor outlet from the surge and head tank being connected to a pump and heat exchanger which leads the liquor back to the cell and a predetermined proportion of the liquor away to a product storage and/or recovery tank.

37. The system of claim 36 wherein said tank includes a salt saturator which is disposed in parallel with the line from the surge and head tank to the electrolytic cell.

38. The system of claim 34 including a gas lift means to provide forced circulation liquor flow.

References Cited
UNITED STATES PATENTS

| | | | |
|---|---|---|---|
| 2,797,192 | 6/1957 | Graff et al. | 204—236X |
| 3,043,757 | 7/1962 | Holmes | 204—236X |

JOHN H. MACK, Primary Examiner

D. R. VALENTINE, Assistant Examiner

U.S. Cl. X.R.

204—95